(No Model.) 2 Sheets—Sheet 1.
J. DAVIS.
WATER FILTER.
No. 486,859. Patented Nov. 29, 1892.
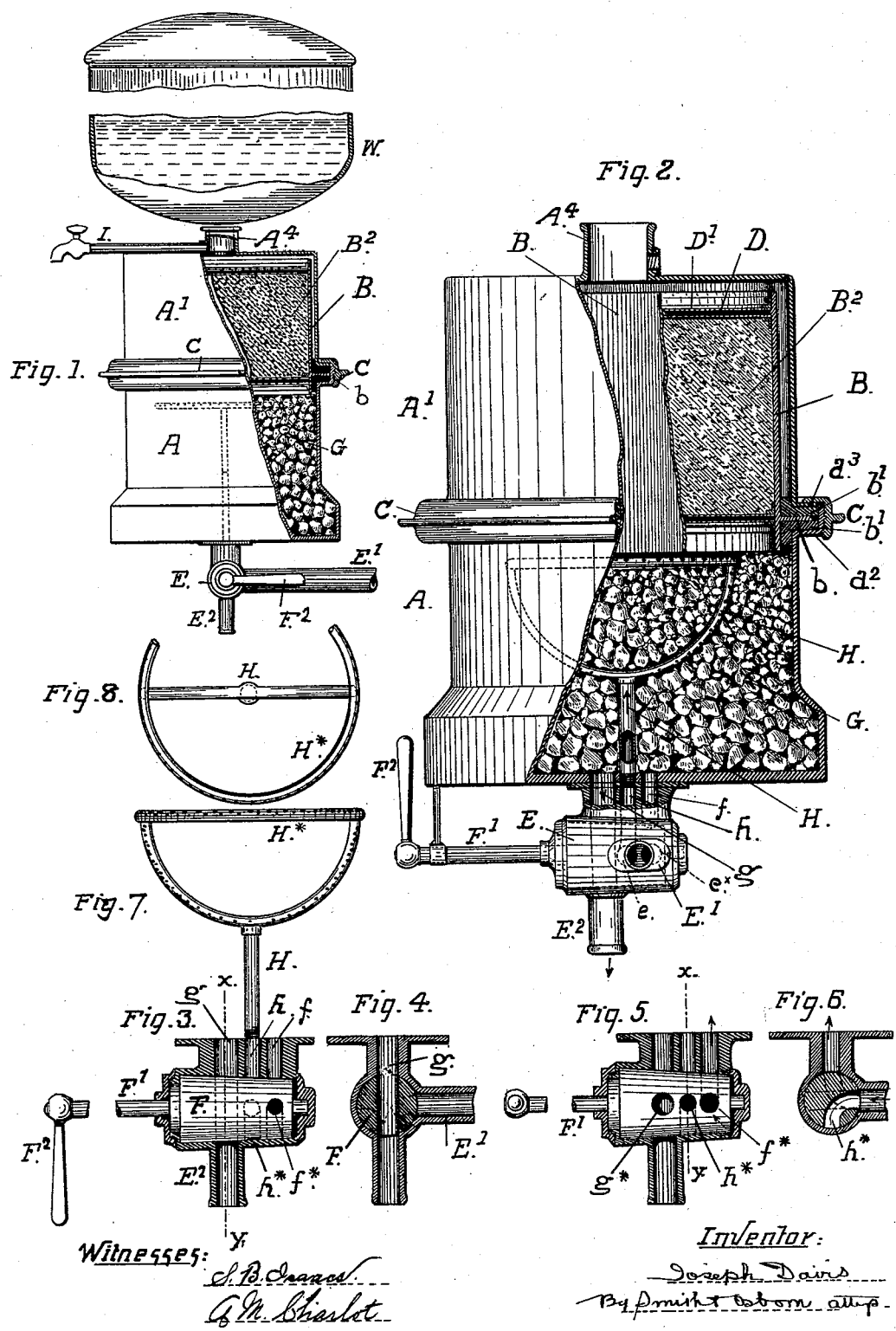

(No Model.) 2 Sheets—Sheet 2.
J. DAVIS.
WATER FILTER.
No. 486,859. Patented Nov. 29, 1892.
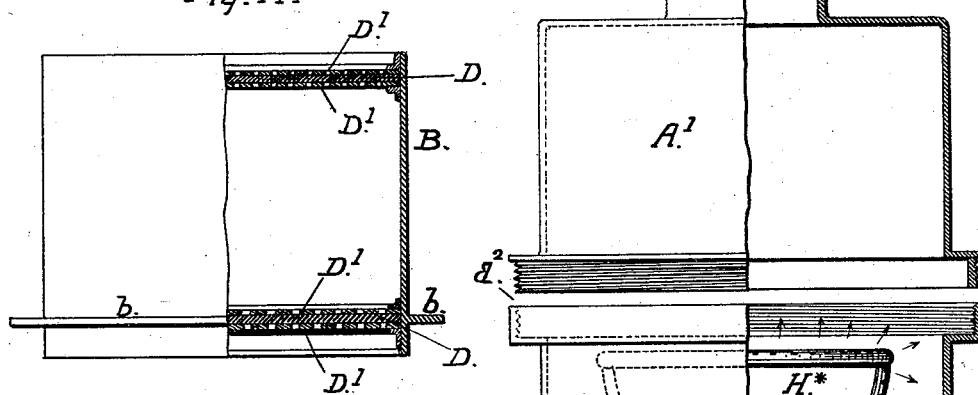
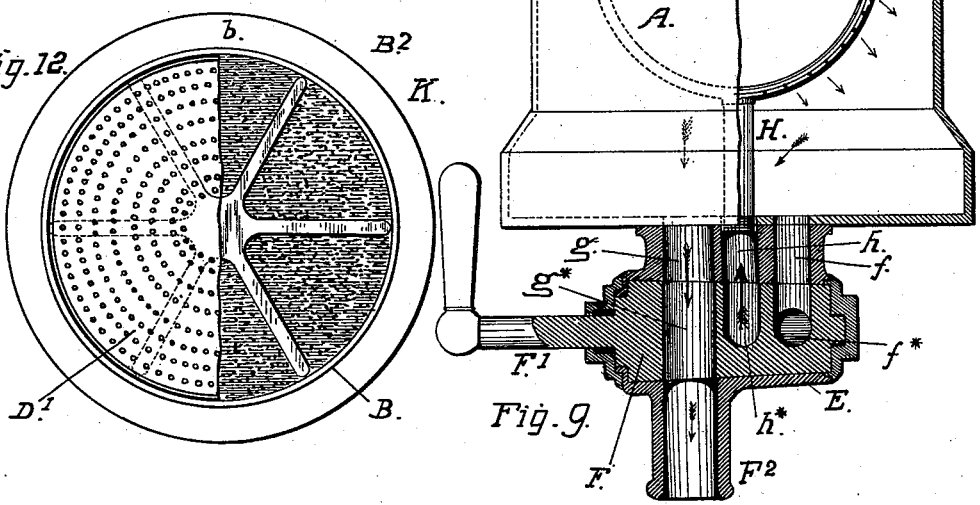
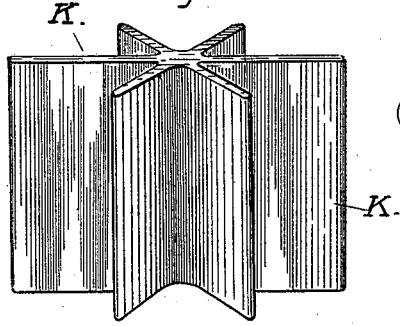
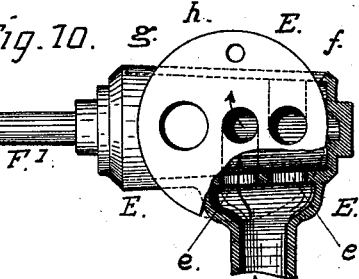
Witnesses:
Inventor:
Joseph Davis
By Dwight Osborn Attys.

UNITED STATES PATENT OFFICE.

JOSEPH DAVIS, OF SAN FRANCISCO, CALIFORNIA.

WATER-FILTER.

SPECIFICATION forming part of Letters Patent No. 486,859, dated November 29, 1892.

Application filed February 23, 1892. Serial No. 422,517. (No model.)

*To all whom it may concern:*

Be it known that I, JOSEPH DAVIS, a citizen of the United States, residing in the city and county of San Francisco and State of California, have invented certain new and useful Improvements in Water-Filters, of which the following is a specification.

My invention relates to water-filters of the kind or description which are connected to the water-supply pipe or service-pipe in a building to purify the water for drinking purposes; and the invention consists in certain novel parts and combination of parts, as hereinafter fully described, producing an improved filtering apparatus for general household or domestic use.

The nature of these improvements and the manner in which I proceed to apply the same and to construct a water-filter for ordinary domestic use in accordance with my invention are fully described in the following specification, in which, also, reference is had to the accompanying drawings.

Referring to the said drawings by letters, Figure 1 is a front view of the filter and the vessel to contain the filtered water with which the filter is connected. The body of the filter is broken away at one side of the figure to expose internal parts. Fig. 2 is a side view of the filter, on an enlarged scale, without the purified-water holder, the walls of the body and the interior carbon-chamber being partly removed to show the construction within. Fig. 3 represents in longitudinal section the faucet that connects the filter with the water-supply pipe and controls the flow of water. Fig. 4 is a vertical section taken through Fig. 3 on the line $x y$. Fig. 5 is a longitudinal section representing the plug or key of the faucet in a different position. Fig. 6 is a vertical section through Fig. 5 on the line $x y$. Fig. 7 is an elevation of the scouring pipe or washer removed from its place in the filter. Fig. 8 is a top view of Fig. 7. Fig. 9 represents in elevation the parts of the filter-body and the faucet and washer, partly in longitudinal section, with the carbon-holder and the filtering medium in the lower part removed from the body. Fig. 10 is a top view of the faucet, partly in section to show the water-passages. Fig. 11 represents in elevation and partly in vertical section the carbon-holder removed from the filter. Fig. 12 represents in top view the same part with the top diaphragm partly removed to expose the carbon. Fig. 13 is a perspective view of the perpendicular partitions in the carbon-holder.

The principal parts or features of this filter comprise a filter-body formed in separable sections, a removable drum or cylinder containing a body of carbon—such as charcoal in a fine condition—or other suitable filtering substance, and having porous heads or diaphragms to confine the carbon, but to allow passage of water through the filtering substance, a body of coarse gravel, pebbles, or similar filtering substance placed between this carbon filter and the water-inlet to remove sand and such heavy or coarse matter from the water before the final filtering operation in the upper part of the filter, and a triple-acting faucet of novel construction by which the filter is connected with the water-supply pipe.

The filter-body is composed of two sections $A$ $A'$, united by a screw-joint, as shown in Fig. 9, or by a screw-coupling ring, as in Fig. 2. Provision is made at one end of the body to connect with it a reservoir or holder for the purified water, and in the bottom or opposite end openings $f$ $g$ $h$ are made for inlet and outlet of water.

Fig. 1 represents a construction and arrangement of my filter in which a water-receptacle $W$ is set upon the filter-body, and a draw-off faucet I is connected to the receptacle through the standing rim or neck $A^4$ on the body. The receptacle $W$ has an aperture in the bottom with a rim or neck of suitable size to fit into the neck $A^4$, and a water-tight joint is made by interposing packing between the parts or by other proper means.

The carbon-holder $B$ is a drum or cylinder somewhat smaller in diameter than the filter-body which incloses it, and having in both ends or heads a diaphragm of some close but porous or pervious material or substance. The diaphragm which I prefer to employ in this holder is formed of two perforated plates of metal $D'$ $D'$ and a pad or layer of asbestus fiber or cloth $D$, confined between the plates. These diaphragms are held in place by flanged rings fitted tightly into the cylinder at top and bottom, as shown in Figs. 2 and 11. The space within the holder B is filled with a body of fine charcoal or other form of carbon for a filtering medium, and the covered ends, formed of the diaphragms before mentioned, are presented in the line or direction of the flow of water above the body of gravel or pebbles G in the lower part of the filter-body. On the carbon-holder B, near the bottom, is a flange $b$, with packing-rings $a^2\ a^3$ fitted between the parts of the joint that unites the sections A A'. The holder with its flange and the packing-rings separate the filter-body into two compartments, and the flange also supports the holder clear of the sides of the surrounding body. The compartment beneath the holder B contains coarse filtering material, and into it the water first flows from the service-pipe and undergoes the preliminary step or operation wherein mud, sand, and the heavier matter and impurities are removed, while the other compartment serves to receive the purified water which has undergone the final operation in the carbon-holder or filtering-chamber B.

It will be noticed that the receiving-vessel W, Fig. 1, is practically an extension or enlargement of the upper compartment, and instead of being a separate vessel such a receiver could be formed by increasing the size of the upper compartment, and the filtered water collecting in this receiver could be drawn off as required through an outlet controlled by a plug or faucet.

A constant supply of filtered water is furnished by this filter, because it is connected directly with the service-pipe of the building in whatever room it is required for use, and is always under pressure during operation. A receiver of large capacity to collect the purified water for distribution will not be required under ordinary circumstances, as the filter is rapid in its work and quickly replaces by freshly-purified water the quantity that may be drawn off from the space at the top of the filter.

To connect the filter with the water-supply pipe, I employ a faucet of novel construction having an outlet and two inlets and passages controlled by a single plug, which in one position allows the water to be drawn off directly for washing and all purposes wherein filtered or purified water is not required, or in another position connects the filter directly with the water-supply pipe, or in another position allows the water to be drawn off from the filter when the supply is cut off in order to cleanse the parts, or to let a small quantity of the purified water escape by dripping or in a fine stream during the night to keep the filtering surfaces and substances sweet and clean.

The body E of the faucet has three passages $f\ g\ h$ that come into line with openings of corresponding size in the body of the filter when the faucet is fixed in place. The plug F is tapered and ground to a close fit in the body and has three passages $f^*\ g^*\ h^*$, the first two opening through the plug in opposite directions, with the inlet-port about ninety degrees from the outlet port on the circumference of the plug, and the third passage $g^*$ leading diametrically through the plug.

In the faucet-body are two inlet-ports $e\ e^*$, which are common to a chamber E' on the side of the faucet and are open to the water-supply at all times, as this chamber is the termination of a pipe to which the service-pipe is coupled. The passage $f^*$ connects the supply-pipe with the inlet-passage $f$ and is brought into position by setting the lever F' horizontally, as illustrated in Fig. 5. In this adjustment the filter is under pressure and the water is being forced upward through the filtering substances and media into the space or receptacle at top.

With the lever turned perpendicularly upward the pressure is diverted from the inlet $f$ into the inlet and passage $h\ h^*$, while at the same time the outlet $g\ g^*$ is established. In that position of the plug the water from the supply-pipe passes through the lower part of the filter containing the gravel or like substance and is discharged at the nozzle $E^2$.

The third position is obtained by turning the handle $F^2$ perpendicularly downward, as shown in Fig. 3, and by that adjustment all the water-inlets are shut and an escape is opened through the outlet $g\ g^*$, the size of which is regulated to allow a greater or less quantity of water to run off from the filter by setting the lever $F^2$ accordingly toward or out of the perpendicular. In this construction it will be noticed that I utilize the water which is drawn off in the unpurified state for ordinary household purposes to scour and wash out the filtering substances and surfaces and by such means I keep the filtering apparatus clean and in good working condition. Such scouring and cleansing action is made complete and effective not only upon the filtering matter or substance G, but upon the lower surface of the filtering-diaphragm in the bottom of the carbon-holder by setting a short pipe H, with a ring or circular head $H^*$, having numerous perforations or apertures, through which the water is discharged both upward against the diaghragm and in various directions laterally through the surrounding substance by virtue of the head or pressure of water from the supply-pipe. As often as water is drawn off for ordinary purposes, therefore, the filter undergoes a cleansing operation without waste of water; but in places where economy in the use of water is not to be considered, the scouring and cleansing can be carried on as frequently as the clearness and purity of the water-supply may seem to require by simply opening the faucet and allowing the water to run in through the inlet $h$ and out through the nozzle $E^2$.

The carbon filter is removable from the filter-body for renewing the carbon or the filtering-diaphragms and is divided by a number of radial partitions into several pockets or separate compartments to hold the filtering substance. These partitions are preferably formed integral, as shown in Fig. 13; but I do not confine myself to that construction, as the partitions in the holder B may be separate plates, if so desired. I prefer to make them of glass and also in one piece, as shown, for the reason that such a form is readily set in place or removed from the holder B and requires no special supporting means to hold the partitions in place. By reason of its general cleanliness and non-absorbing qualities I prefer to make these partitions of glass. Such form as those represented is easily molded.

Carbon filters of the kind herein described, which are subject to pressure when in operation, are liable to become packed or their substance compressed by the force of the water, so that the upper portion soon becomes quite solid and too close for the water to pass through, and consequently the filtering operation is retarded and considerably reduced in a short time. I have found, however, that excellent results are obtained by dividing the single body of carbon or filtering material by means of perpendicular partitions K into separate portions of about equal quantity. The effect of this construction appears to be that the force of the water is divided and distributed equally through the mass and is directed upward from the center radially outward at the same time. The practical result gained is the increased serviceableness of the carbon and the regularity of its action during service.

Having thus fully described my invention, what I claim, and desire to secure by Letters Patent, is—

1. A water-filter comprising an outer case or body composed of two sections and held together by means of an annular ring O, having a filtering-compartment containing coarse filtering material and connected with a supply or service pipe under pressure and having a compartment which forms a receiver for filtered water, an inner shell or holder having porous filtering heads or ends, and a body of fine filtering material confined between said filtering-heads setting in said receiving-compartment and forming the dividing wall or partition between said compartment and the said filtering-compartment, removable radial partitions in said holder, an outlet for drawing off the filtered water, an inlet in said filtering-compartment having direct connection with the unfiltered water-supply, a direct outlet for the unfiltered water from said compartment, and a faucet having ports and passages adapted to open and close said inlets and outlet for operation, substantially as set forth.

2. The combination of the case or body having a filtering-compartment containing coarse filtering material, and a compartment separated from it by a porous filtering-partition and having an outlet for drawing off filtered water, and the faucet having two water-inlet ports and passages communicating separately with a supply or service pipe through the plug of the faucet, and a discharge outlet and passage from the filtering-compartment through the faucet-plug, substantially as set forth.

3. In a water-filter, the combination, with a case or body having a compartment containing a filtering substance or material, of the faucet having ports and passages $f f^* g g^* h h^*$, and the scouring-pipe H, substantially as set forth.

4. The combination of the case or body formed of separable sections, the removable cylinder B, having the flange $b$, the packings $a^2 a^3$, the flanged coupling by which the sections are united and the flange $b$ is clamped and held to produce a water-tight joint, the porous filtering-diaphragms in the heads of the cylinder, consisting in the removable plates and interposed filtering-pads, and the filtering material, such as fine carbon, and the removable radial partition in said cylinder, substantially as set forth.

5. In a water-filter, the carbon-holder having removable radial partition forming separate pockets or receptacles for the filtering substance and porous filtering-heads or ends, substantially as set forth.

6. In a water-filter, the combination, with the carbon-holder B, containing a filtering substance, as described, of the removable radial partitions K, and the porous filtering-diaphragms D D' D D', and the fibrous filtering-disks between the perforated diaphragms D D', substantially as set forth.

In testimony that I claim the foregoing I have hereunto set my hand and seal.

JOSEPH DAVIS. [L. S.]

Witnesses:
C. W. M. SMITH,
CHAS. E. KELLY.